United States Patent
Berman

(10) Patent No.: US 6,804,840 B2
(45) Date of Patent: Oct. 19, 2004

(54) POSITIVE PRESSURE WASTE TRANSFER SYSTEM

(75) Inventor: Claude L. Berman, Ypsilanti, MI (US)

(73) Assignee: Thetford Corporation, Ann Arbor, MI (US)

( * ) Notice: Subject to any disclaimer, the term of this patent is extended or adjusted under 35 U.S.C. 154(b) by 40 days.

(21) Appl. No.: 10/171,857

(22) Filed: Jun. 14, 2002

(65) Prior Publication Data
US 2003/0229939 A1 Dec. 18, 2003

(51) Int. Cl.$^7$ ............................................. E03D 11/10
(52) U.S. Cl. ................................................ 4/434; 4/323
(58) Field of Search .......................... 4/434, 435, 332, 4/323, 321

(56) References Cited

U.S. PATENT DOCUMENTS

| | | | |
|---|---|---|---|
| 289,210 A | 11/1883 | Bishop | |
| 2,315,824 A | 4/1943 | Sweeny | 4/77 |
| 3,566,415 A | 3/1971 | Culp | 4/10 |
| 3,629,099 A | * 12/1971 | Gahmberg et al. | 210/104 |
| 3,698,019 A | 10/1972 | Culp | 4/10 |
| 3,720,962 A | 3/1973 | Harrah | 4/52 |
| 3,727,241 A | 4/1973 | Drouhard, Jr. et al. | 4/10 |
| 3,968,526 A | 7/1976 | Harrah | 4/79 |
| 4,013,557 A | * 3/1977 | Snodgrass et al. | 210/712 |
| 4,156,297 A | 5/1979 | Pilolla | 4/320 |
| 4,170,048 A | 10/1979 | Anthony | 4/321 |
| 4,286,342 A | 9/1981 | Anthony | 4/321 |
| 4,306,321 A | 12/1981 | Norlin | 4/321 |
| 4,376,314 A | 3/1983 | Iwans | 4/431 |
| 4,672,689 A | 6/1987 | Heinze et al. | 4/415 |
| 4,819,279 A | 4/1989 | Sigler et al. | 4/300 |
| 4,928,326 A | 5/1990 | Olin et al. | 4/300 |
| 5,036,554 A | 8/1991 | Blount | 4/323 |
| 5,133,853 A | 7/1992 | Mattsson et al. | 210/104 |
| 5,165,457 A | 11/1992 | Olin et al. | 4/300 |
| 5,245,710 A | 9/1993 | Haselswerdt et al. | 4/319 |
| 5,396,668 A | 3/1995 | Haatanen | 4/431 |
| 5,813,061 A | 9/1998 | Tornqist | 4/431 |
| 5,873,135 A | 2/1999 | Tornqvist | 4/431 |
| 5,970,527 A | 10/1999 | Martin et al. | 4/361 |
| 6,101,638 A | 8/2000 | Hammond | 4/111.1 |
| 6,216,284 B1 | 4/2001 | Kline et al. | 4/431 |
| 6,279,176 B1 | 8/2001 | Aviles | 4/354 |

* cited by examiner

Primary Examiner—Gregory L. Huson
Assistant Examiner—Huyen Le
(74) Attorney, Agent, or Firm—Harness, Dickey & Pierce, P.L.C.

(57) ABSTRACT

A waste transfer system includes a toilet bowl, a discharge pipe, and a hopper. The hopper is positioned between the toilet bowl and the discharge pipe. A first valve is disposed between the toilet bowl and the hopper. A second valve is disposed between the hopper and the discharge pipe. A source of fluid is in communication with the hopper for pressurizing the hopper to a predetermined pressure. A method of transferring waste through the waste transfer system includes the step of opening the first valve to permit the passage of waste from the toilet bowl to the hopper and subsequently closing the first valve. The method additionally includes the step of pressurizing the hopper while the first and second valves are closed. The method further includes the step of opening the second valve to thereby force the waste from the hopper into and through the discharge pipe.

20 Claims, 3 Drawing Sheets

POSITIVE PRESSURE WASTE TRANSFER SYSTEM

FIELD OF THE INVENTION

The present invention generally relates to waste management systems. More particularly, the present invention relates to such a system that utilizes a source of positive pressure for transferring waste at a high velocity. More specifically, but without restriction to the particular embodiment and/or use which is shown and described for purposes of illustration, one particular aspect of the present invention pertains to a waste transfer system having a hopper that is pressurized with a source of compressed air and includes a downstream valve that is opened to project waste from the hopper.

BACKGROUND OF THE INVENTION

Vehicles including recreational vehicles ("RVs"), airplanes, boats, trains, and the like conventionally incorporate bathrooms and associated waste management systems for the convenience and comfort of the passengers. Waste from an associated toilet is normally stored in a holding tank. It is not always possible or desirable to place the holding tank directly under the toilet. Manufacturers of these vehicles desire to make them as "homelike" as possible. In addition to general comfort and aesthetic features, this means that the vehicle toilets should be able to flush all foreign objects typically accommodated by a residential toilet.

Various types of waste transfer systems have been developed over the years in an effort to advance the pertinent art. One common type of system relies on a negative pressure differential or vacuum to transfer waste to a holding tank. One example of a vacuum type waste transfer system is shown and described in U.S. Pat. No. 4,819,279. The system of U.S. Pat. No. 4,819,279 includes a single pump with valves on opposite sides that allow the pump to serve as a vacuum source and to discharge holding tank contents.

The limitations of vacuum differential type systems, such as the one disclosed in U.S. Pat. No. 4,819,279, are well known. For example, such systems are generally limited to a maximum theoretical differential equal to atmospheric pressure (14.7 PSI at sea level). In practice, the actual differential used is considerably less. In order to pull waste completely through the system, it is necessary to provide a costly vacuum reservoir towards the downstream end of the system. Due to weight and cost constraints, this vacuum tank is typically limited to about 5 PSI under atmospheric pressure. The problem of possible collapse is inherent in the flexible discharge lines and also limits the maximum available negative pressure to much less than the theoretical maximum. Finally, the cost of vacuum pumps increases as the amount of negative pressure increases.

In another known type of waste transfer system, flush water is pressurized to facilitate flushing. Such pressurization is referred to in the art as "jet assist". In a standard, siphon-type toilet, jet assist has been conventionally used to impart some energy to water standing in the bowl and thus trigger the siphon effect with less water than would normally be needed. While perhaps beneficial for certain applications, this effect is of no use in vehicle systems that typically empty waste directly and do not rely on a siphon for flushing.

Conventional waste transfer systems have also incorporated cutting blades for waste maceration. Such maceration type systems typically utilize a two stage process with maceration by a rotary chopper followed by pumping of the macerated waste. One example of such a system is shown in U.S. Pat. No. 4,156,297.

Systems that rely on maceration are generally associated with two major deficiencies. The first deficiency is that known macerators do not reliably handle tough fibrous waste. The material gets caught in the macerator and eventually stops it, resulting in inconvenience and added expense for repair. These systems are similarly unable to accommodate hard objects such as pebbles and coins that frequently find their way into the system. The second major deficiency is that the pumps used to move liquid waste cannot pump air. Therefore, the only ways to completely clear the discharge lines is to either have a downwardly draining system or continue to introduce clean water into the line after the waste as entered it using an impractical amount of water.

A final type of system known in the art utilizes a positive airflow to assist waste transfer. One such system is shown and described in U.S. Pat. No. 3,720,962. In the system of U.S. Pat. No. 3,720,962, a positive air flow is used to assist the transfer of waste from a hopper and through the discharge lines. The flush cycle is 3 to 15 seconds, with 5 seconds considered to be optimal.

Conventional systems utilizing a positive pressure assist fail to complete clear the discharge lines without a downwardly draining systems. This inability to clear the discharge lines becomes more significant as the horizontal travel distance increases. When the discharge lines are not completely cleared, undesirable odors can permeate through them. This problem is specifically addressed in U.S. Pat. No. 6,216,284 which discloses costly discharge lines designed to eliminate odor permeation.

Known waste transfer systems have proven to be generally acceptable for their intended application. It will not be appreciated, however, that all systems are all associated with disadvantages. Some of these disadvantages are discussed above. Continuous advancement of the pertinent art is therefore desirable.

SUMMARY OF THE INVENTION

It is a primary object of the present invention to provide a waste transfer system that overcomes the limitations of the prior art, including but not limited to those limitations discussed above.

It is another object of the present invention to provide a waste transfer system for a motor vehicle that allows for improved flexibility in relative placement between a toilet and an associated holding tank design.

It is another object of the present invention to provide a waste transfer system able to quickly and efficiently transfer waste in a vertically upward direction and for long distances horizontally.

It is another object of the present invention to provide a waste transfer system with high tolerances to foreign objects.

It is another object of the present invention to provide a waste transfer system that is able to utilize smaller diameter, less costly discharge plumbing hoses and/or pipes which are inherently less costly and more flexible.

It is another object of the present invention to provide a waste transfer system in which waste water exists a hopper under high pressure and at high speed.

It is another object of the present invention to provide a waste transfer system in which discharge lines are substantially cleared of waste water.

It is another object of the present invention to provide a waste transfer system with improved reliability.

It is another object of the present invention to provide a waste transfer system which breaks up waste without the need of a mechanical macerator.

According to one aspect, the present invention provides a waste transfer system including a toilet bowl, a discharge pipe, and a hopper. The hopper is positioned between the toilet bowl and the discharge pipe. A first valve is disposed between the toilet bowl and the hopper. A second valve disposed between the hopper and the discharge pipe. A source of compressed air is in communication with the hopper for pressurizing the hopper to a predetermined pressure until release by the second valve.

In a related form, the present invention provides a waste transfer system including a toilet bowl, a discharge pipe, and a hopper. The waste transfer arrangement further includes a valving arrangement operative to permit the introduction of material from the toilet bowl to the hopper under the force of gravity, selectively seal the hopper, pressurize the hopper to a predetermined pressure with a source of compressed air, and discharge the material from the hopper to the discharge line by quickly depressurizing the hopper from the predetermined pressure to an atmospheric pressure.

According to another aspect, the present invention provides a method of transferring waste through a waste transfer system having a hopper positioned between a toilet bowl and a discharge pipe. The waste transfer system includes a first valve between the toilet bowl and the hopper and a second valve between the hopper and the discharge pipe. The method includes the step of opening the first valve to permit the passage of waste from the toilet bowl to the hopper and subsequently closing the first valve to seal the hopper. The method additionally includes the step of pressurizing the hopper while the first and second valves are closed. The method further includes the step of opening the second valve to thereby force the waste from the hopper into and through the discharge pipe. The hopper is preferably pressurized to a predetermined pressure of approximately 30 to 80 PSI and the method preferably includes the step of depressurizing the hopper from the predetermined pressure to atmospheric pressure in less than approximately one second.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
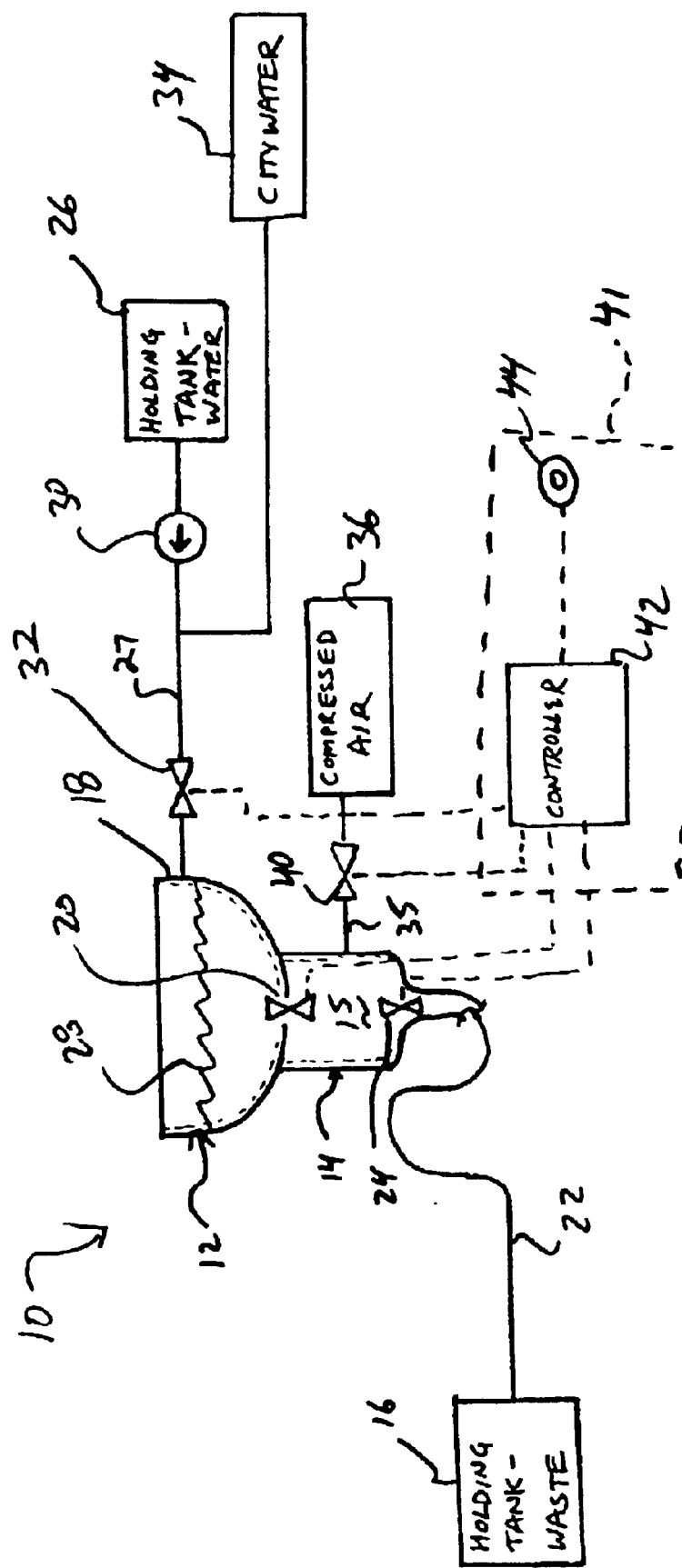
FIG. 1 is a schematic illustration of a waste transfer system constructed in accordance with the teachings of a first preferred embodiment of the present invention.

With initial reference to the schematic diagram of FIG. 1 of the drawings, a positive pressure waste transfer system constructed according to the teachings of a first preferred embodiment of the present invention is illustrated and generally identified at reference character 10. The waste transfer system 10 of the present invention is specifically intended for vehicles, including but not limited to RVs (referred to in Europe as caravans), airplanes, boats, trains and like. Those skilled in the art, however, will appreciate that the teachings of the present invention also have application for home, business and other non-transitory uses.

The waste transfer system 10 of the present invention is schematically shown to generally include a toilet bowl 12, a hopper 14 and a waste holding tank 16. In the arrangement illustrated, the waste holding tank 16 is positioned remotely from the toilet bowl 12 and hopper 14. As will become apparent to those skilled in the art, the waste transfer system 10 of the present invention provides for improved flexibility in placement of the bowl 12 and hopper 14 relative to the waste holding tank 16.

In the embodiment illustrated, the toilet bowl 12 and hopper 14 are defined by a common casing 18. The common casing 18 may be constructed of china, plastic or any other suitable material. The toilet bowl 12 is in fluid communication with the hopper 14 through a first or upstream valve 20. In one particular application, the first valve 20 is a slide valve. One suitable slide valve is shown and described in commonly assigned U.S. Pat. No. 6,397,405, which is hereby incorporated by reference as if fully set forth herein. Alternatively, other types of valves may be incorporated between the toilet bowl 12 and the hopper 14, including but not limited to ball valves, "trap door" valves and the like. In certain applications, it may be desirable to provide the upstream valve 20 with an interlock to prevent opening if the pressure in the hopper 14 is greater than atmospheric pressure.

The hopper 14 defines a chamber 15 having a capacity between approximately 1.5 and 2.5 gallons. A lower end of the hopper 14 is in fluid communication with a discharge line or pipe 22. A second or downstream valve 24 functions to selectively open and close an opening between the lower end of the hopper 14 and the discharge line or pipe 22. The second valve 24 is preferably a ball valve. Alternatively, the second valve 24 may be a pressure relief valve that automatically opens when the pressure in the hoppers reaches a pre-determined set point. At its opposite end, the discharge line or pipe 22 is connected to the waste holding tank 16. In the preferred embodiment, the discharge pipe has a diameter of approximately one (1) inch.

The toilet bowl 12 is conventionally connected to a water holding tank 26 by a water line 27. The water holding tank 26 provides a source of water 28 for rinsing and flushing of the toilet bowl 12. An inline demand pump 30 pumps the water 28 from the holding tank 26 to the toilet bowl 12. In one application, the demand pump 30 is rated at 40 PSI and 3 gallons/minute. A third valve or water valve 32 controls flow of the water 28 through the line 27 and into the toilet bowl 12. The water valve 32 is preferably a solenoid valve 32. The waste transfer system 10 is also adapted to use a source of city water 34. In this regard, the city water source 34 may be connected to the line 27 in a conventional manner.

The hopper 14 is in fluid communication with a fluid source operative to pressurize the hopper 14 through a line 35. In the preferred embodiment, the fluid source is a source of compressed air 36. A fourth valve or air valve 40 controls flow of the compressed air 36 through the line 35 and into the hopper 14. The fourth valve 40 is preferably a solenoid valve. The air valve 40 cooperates with the upstream and downstream valves 20 and 24 for selectively and completely sealing the hopper 14. In the preferred embodiment, the hopper 14 includes a pressure relief valve (not shown).

The compressed air source 36 is adapted to pressurize the hopper to a predetermined pressure. Preferably, the predetermined pressure is between approximately 30 and 80 PSI. Further preferably, the predetermined pressure is at least approximately 30 PSI. In one particular application, the predetermined pressure is approximately 60 PSI.

The waste transfer system 10 of the present invention further includes a control arrangement 41 for controlling a sequencing of the valves 20, 24, 32, and 40. The control arrangement is illustrated to generally include a controller in the form of a programmable microprocessor 42. The control arrangement 41 is illustrated to further include a manually operated actuator 44 for activating the controller 42. In the preferred embodiment, the actuator 44 is a button located on the casing 18. In other applications, it may be desirable to incorporate a handle, such as a conventional toilet handle, for activating a switch (not shown) to actuate the controller 42.

Use of the waste transfer system 10 of the present invention will now be described. When the waste transfer system 10 is not in use, all of the valves 20, 24, 32 and 40 are closed and the toilet bowl 12 is partially filled with water 28. Upon manual actuation of the button 44, the controller 42 opens the second valve or downstream hopper valve 24 to relieve any pressure in the hopper 14 above atmosphere. Next, the controller 42 opens the upstream valve 20 to allow water and waste to enter the hopper 14 under the force of gravity. The controller 42 then opens the water valve 32 to rinse the toilet bowl 12.

At this point of operation, the controller 42 closes the upstream valve 20 to thereby seal the hopper 14 while water valve 32 remains open. The controller 42 closes the water valve 32 upon refilling of the toilet bowl 12. With the hopper 14 now completely sealed, the controller 14 operates to open the air valve 40 for pressurizing the hopper to a predetermined pressure of approximately 30–80 PSI. Upon reaching the predetermined pressure, the controller 42 closes the air valve 40 and subsequently opens the downstream valve 24. The predetermined pressure can be sensed in any manner well known in the art. For example, a standard pressure sensor (e.g., strain gauge and quartz crystal type) can be disposed in the hopper 14.

Opening of the downstream valve 24 releases the pressure and allows the hopper 14 to return to atmospheric pressure. Through opening of the downstream valve 24, the waste and water is violently ejected through the discharge line 22 with a flush cycle of less than approximately one second. In other words, the time of the period between opening of the downstream valve 24 and return of the hopper 14 to atmospheric pressure is less than approximately one second.

The pressure-induced force on any solid waste within the hopper 14 is sufficient to force it through the one-inch diameter discharge line 22 without any clogging problems. The one inch diameter discharge line 22 presents a 0.78 square inch cross sectional area for flow. At a predetermined hopper pressure of 60 PSI, waste exiting the hopper 14 experiences a force of 47 pounds. Under test conditions, this force has proven to be sufficient to macerate (or pulverize) the waste without the need for cutting blades conventionally required in other known waste transfer systems.

Figure 2:
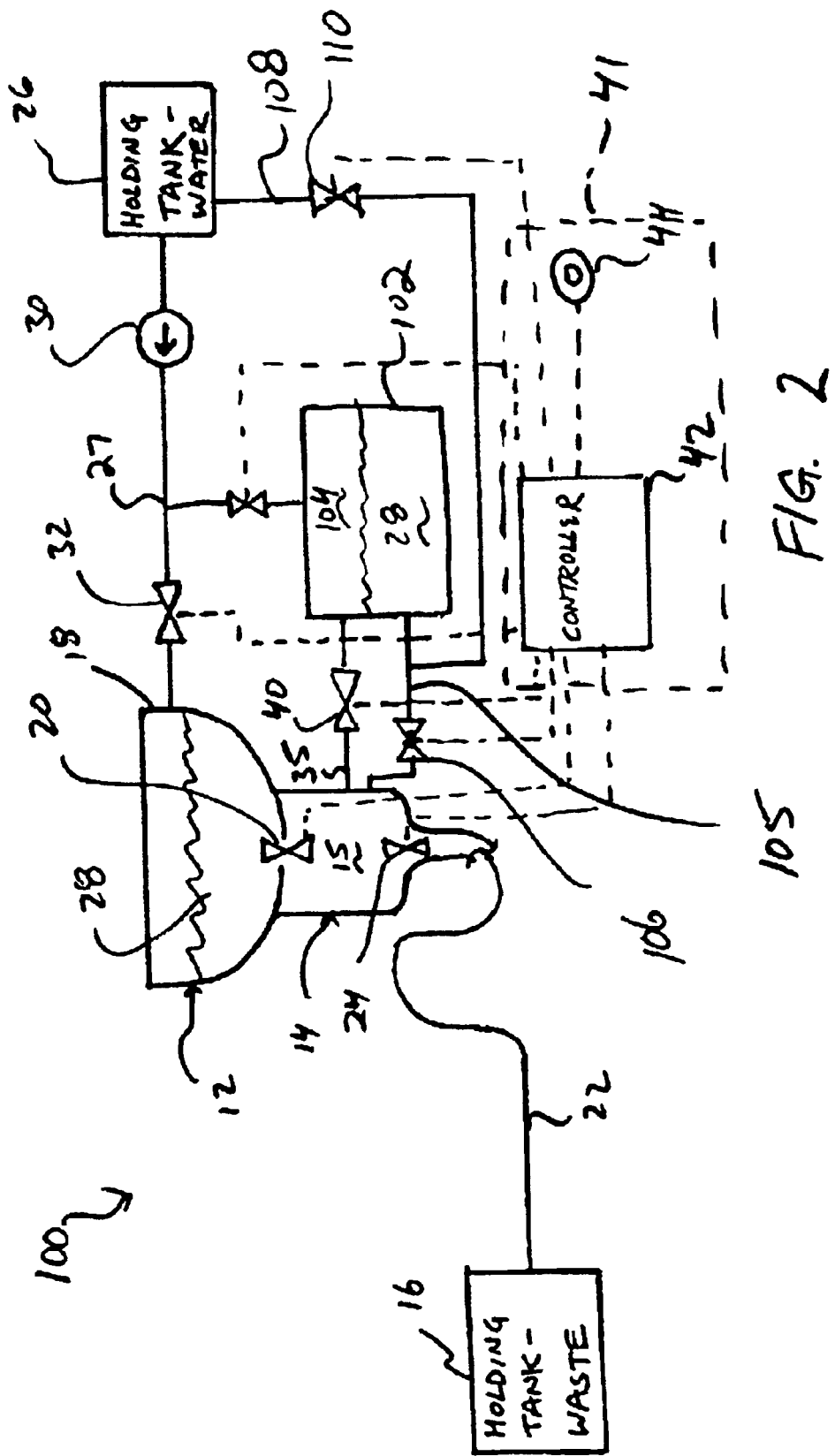
FIG. 2 is a schematic illustration of a waste transfer system constructed in accordance with the teachings of a second preferred embodiment of the present invention.
Figure 3:
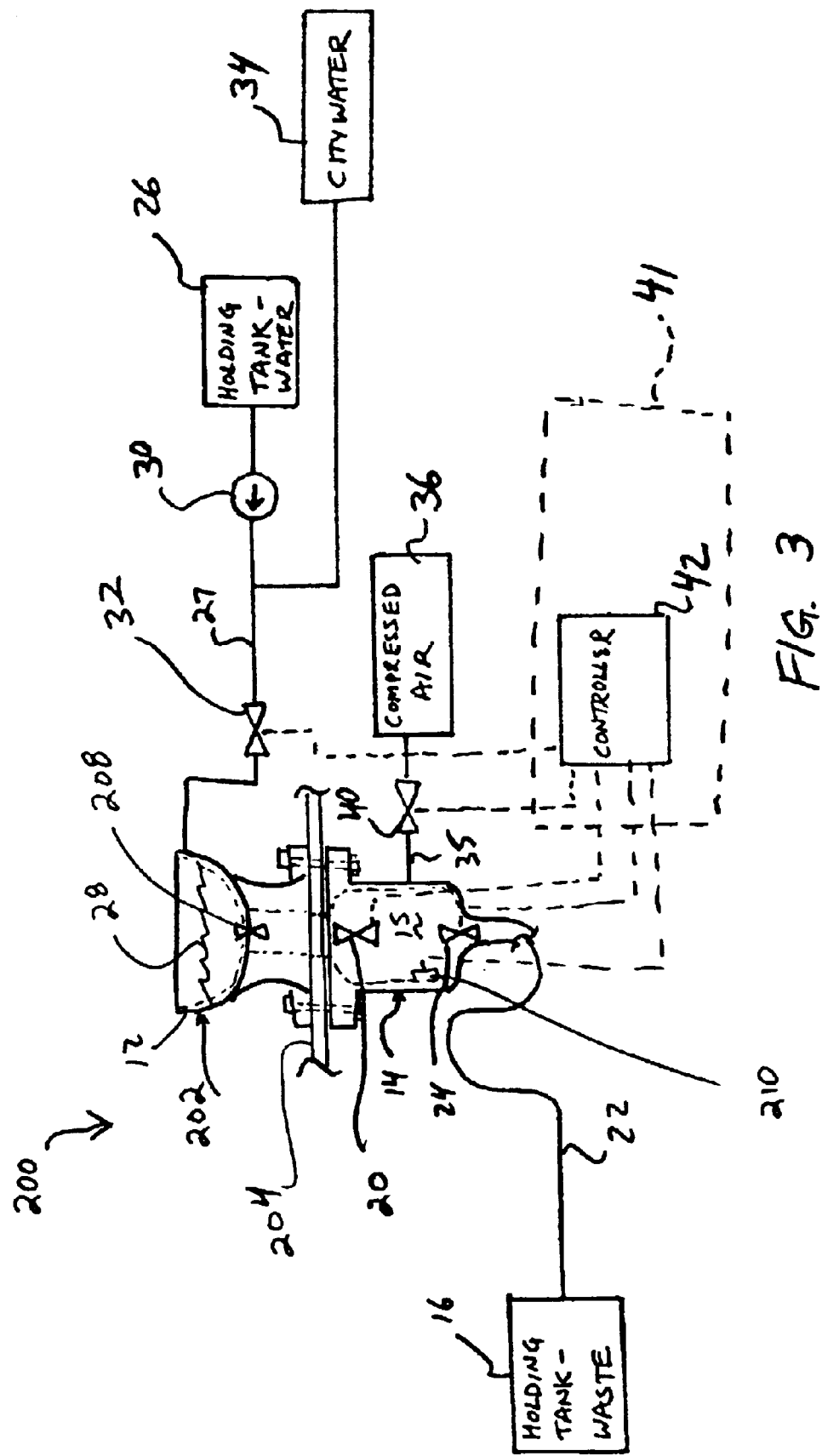
FIG. 3 is a schematic illustration of a waste transfer system constructed in accordance with the teachings of a third preferred embodiment of the present invention.

Turning now to the schematic diagram of FIG. 2 of the drawings, a waste transfer system constructed according to the teachings of a second preferred embodiment of the present invention is illustrated and generally identified at reference character 100. In view of the similarities between the first and second preferred embodiments of the present invention, like reference characters are used to identify like elements. It will be understood that the method of moving pre-pressurized waste water through the discharge line 22 is identical between the two systems 10 and 100.

The system 100 of the second preferred embodiment of the present invention differs from the first embodiment in that it utilizes the demand pump 30 to generate the compressed air rather than requiring a separate air compressor. The waste transfer system 100 includes a pressure reservoir air tank 102 that is charged with water by the demand pump 30, thus compressing and pressurizing the air 104 in the tank 102. The compressed air 104 is delivered to the hopper 14 through the line 35 and is used to power the waste transfer system 100 in the same manner as system 10.

While not necessary in all applications, the system 100 is illustrated to further include provision for rinsing of the hopper 14. In this regard, a lower portion of the tank 102 is in fluid communication with the hopper 14 through a line 105. Opening of an in-line valve 106 by the controller 42 operates to deliver pressurized water from the tank 102 to the hopper 104 for rinsing of the hopper 14.

A return line 108 further connects the tank 102 and the holding tank water 26. Flow through the return line 108 is controlled by a valve 110. Opening of the valve 110 with the controller 42 allows water 28 in the pressure reservoir tank 102 to drain back to the fresh water holding tank 26. While not illustrated, it will be understood by those skilled in the art that alternatively to using fresh water as the working fluid, an alternate reservoir could be provided such that two tanks act as an air-spring to shuttle fluid back and forth as needed.

Turning now to the schematic diagram of FIG. 2 of the drawings, a waste transfer system constructed according to the teachings of a second preferred embodiment of the present invention is illustrated and generally identified at reference character 200. The waste transfer system 200 of the third preferred embodiment is conceptually similar to the first preferred embodiment. In view of the similarities between the first and third preferred embodiments, like reference characters are used to identify like elements.

The system 200 of the third preferred embodiment differs from the first preferred embodiment by incorporating a self-contained hopper 14 that cooperates with a toilet 202. The toilet 202 is mounted to an upper side of a floor 204 in any manner well known in the art. In the embodiment illustrated, the toilet 202 is integrally formed to include flanges that are interconnected to the floor 204 with bolts. It will be understood that except to any extent described to the contrary, the toilet 202 is conventional in construction and operation.

The hopper 14 of the third preferred embodiment cooperates with the toilet 202 and is mounted to an underside of the floor 204. In the embodiment illustrated, the hopper 14 includes flanges that are interconnected to the floor 204 with bolts. Alternatively, other manners known in the art may be employed for such attachment.

The self-contained hopper 14 includes the second or upstream hopper valve 20. The toilet 202 includes a release valve 208. In the embodiment illustrated, the release valve 208 does not function to contain pressure within the hopper 14, but operates in a conventional manner to hold water 28 in the bowl 12 of the toilet 202.

The control arrangement 41 of the system 200 of the third preferred embodiment does not include a button for actuating the controller 42. Rather, initiation of a waste transfer cycle to sequence the valves 20, 24, and 40 is automatically controlled by a sensor 210 disposed in the hopper 14. In operation, the second valve 20 will be initially open waiting to receive waste from toilet release valve 208. When the release valve 208 is opened, the sensor 210 in the hopper 14 will detect the presence of waste and send a signal to the controller 42 to initiate a waste transfer cycle. Alternatively, a switch or interlock (not shown) with the toilet 202 will initiate the cycle and then lock the release valve 208 until the cycle is completed. The waste transfer cycle is initiated with closure of the upstream valve 20. The remaining operation is identical to that described in connection with the first preferred embodiment and need not be repeated.

It will now be appreciated that the waste transfer systems 10, 100 and 200 of the present invention provide improved arrangements that utilize air pressure to force waste water through discharge lines 22 into a holding tank 16. Operation of upstream and downstream valves 20 and 24 of the hopper 14 and an air valve 40 are coordinated to introduce a source of compressed air 36 into the hopper 14 at high pressure and thereby pressurize the hopper 14. By rapidly opening the downstream valve 24, waste water exits the hopper 14 under high pressure and at high velocity. Experimental evidence indicates that the waste transfer system 10 of the present invention has the benefits of lower water consumption, smaller diameter discharge lines and discharge lines substantially cleared of waste water. Additionally, it has been shown that trouble free operation of the waste transfer systems 10, 100 and 200 is achievable even when the systems 10, 100 and 200 are presented with fibrous material capable of clogging conventional macerators.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A waste transfer system comprising:
    a toilet bowl;
    a discharge pipe;
    a hopper positioned between the toilet bowl and the discharge pipe, the second valve and the first valve selectively operable to completely seal the hopper;
    a first valve disposed between the toilet bowl and the hopper;
    a second valve disposed between the hopper and the discharge pipe; and
    a source of fluid in communication with the hopper for pressurizing the hopper when the hopper is completely sealed to a predetermined pressure until the predetermined pressure is released by the second valve;
    whereby opening of the second valve when the hopper is pressurized to the predetermined pressure operates to advance contents of the hopper through the discharge pipe at a high velocity.

2. The waste transfer system of claim 1, wherein the source of fluid is a source of compressed air connected to the hopper through a third valve.

3. The waste transfer system of claim 2, further comprising an electronic controller for controlling a sequencing of the first, second and third valves for completely sealing and pressurizing the hopper.

4. The waste transfer system of claim 3, further comprising an actuator which is manually operated such that the electronic controller automatically controllers the sequencing of the first, second and third valves in response to a single manual actuation of the actuator.

5. The waste transfer system of claim 4, wherein the actuator is a push button.

6. The waste transfer system of claim 1, wherein the hopper is pressurizable to a pressure of approximately 30–80 PSI.

7. The waste transfer system of claim 1, wherein the hopper is pressurizable to a pressure of at least 30 PSI.

8. The waste transfer system of claim 1, further comprising:
    a demand pump for pumping a source of water to the toilet bowl; and
    a pressure reserve air tank providing the source of fluid, the pressure reserve air containing the source of fluid and being pressurized by the demand pump.

9. A method of transferring waste through a waste transfer system having a hopper positioned between a toilet bowl and a discharge pipe, the waste transfer system further including a first valve between the toilet bowl and the hopper and a second valve between the hopper and the discharge pipe, the method including the steps of:
    opening the first valve to permit the passage of waste from the toilet bowl to the hopper;
    closing the first valve to completely seal the hopper;
    pressurizing the hopper while the first and second valves are closed; and
    opening the second valve to thereby force the waste from the hopper into and through the discharge pipe at a high velocity.

10. The method of transferring waste through a waste transfer system of claim 9, wherein the step of pressurizing the hopper includes the step of pressurizing the hopper with a source of compressed air.

11. The method of transferring waste through a waste transfer system of claim 10, wherein the source of compressed air is connected to the hopper through a third valve and the step of pressurizing the hopper with a source of compressed air includes the step of opening the third valve.

12. The method of transferring waste through a waste transfer system of claim 9, wherein the step of pressurizing the hopper includes the step of pressurizing the hopper to a predetermined pressure.

13. The method of transferring waste through a waste transfer system of claim 12, wherein the step of pressurizing the hopper to a predetermined pressure includes the step of pressurizing the hopper to a predetermined pressure of approximately 30–80 PSI.

14. The method of transferring waste through a waste transfer system of claim 12, wherein the step of pressurizing the hopper to a predetermined pressure includes the step of pressurizing the hopper to a predetermined pressure of at least 30 PSI.

15. The method of transferring waste through a waste transfer system of claim 12, wherein the step of opening the second valve includes the step of depressurizing the hopper from the predetermined pressure to atmospheric pressure in less than approximately one second.

16. The method of transferring waste through a waste transfer system of claim 12, further comprising the step of opening the second valve to relieve any pressure in the excess of atmospheric pressure in the hopper prior to the step of opening the first valve to permit the passage of waste from the toilet bowl to the hopper.

17. A waste transfer system comprising:

a toilet bowl;

a discharge pipe;

a hopper positioned between the toilet bowl and the discharge pipe; and a valving arrangement operative to permit the introduction of material from the toilet bowl to the hopper under the force of gravity, selectively and completely seal the hopper, pressurize the hopper to a predetermined pressure with a source of compressed air, and discharge the material from the hopper to the discharge line at a high velocity by quickly depressurizing the hopper from the predetermined pressure to an atmospheric pressure.

18. The waste transfer system of claim 17, further comprising a control arrangement for automatically controlling a sequencing of the valving arrangement in response to a single manual input.

19. The waste transfer system of claim 17, wherein the controller arrangement includes an electronic controller and a push button actuator.

20. The waste transfer system of claim 17, wherein the valving arrangement includes a downstream valve positioned between the hopper and the discharge pipe.

* * * * *